US009791159B2

(12) United States Patent
Kelly et al.

(10) Patent No.: US 9,791,159 B2
(45) Date of Patent: Oct. 17, 2017

(54) STORAGE SYSTEMS

(71) Applicant: Electrolux Home Products, Inc., Charlotte, NC (US)

(72) Inventors: Paul H. Kelly, Anderson, SC (US); Robert L. Cushman, Sunrise Beach, MO (US); Robert J Turnbull, Greenville, MI (US); Charles D. Baker, Anderson, SC (US); Aaron W. Arvia, Anderson, SC (US)

(73) Assignee: ELECTROLUX HOME PRODUCTS, INC., Cleveland, OH (US)

( * ) Notice: Subject to any disclaimer, the term of this patent is extended or adjusted under 35 U.S.C. 154(b) by 0 days.

(21) Appl. No.: 14/616,976

(22) Filed: Feb. 9, 2015

(65) Prior Publication Data

US 2015/0153053 A1 Jun. 4, 2015

Related U.S. Application Data

(62) Division of application No. 11/758,141, filed on Jun. 5, 2007, now Pat. No. 8,979,621.

(51) Int. Cl.

| | |
|---|---|
| ***A47J 47/00*** | (2006.01) |
| ***F25D 11/02*** | (2006.01) |
| ***F16K 7/10*** | (2006.01) |
| ***E05C 3/04*** | (2006.01) |
| ***A47F 3/04*** | (2006.01) |
| ***F24F 7/007*** | (2006.01) |

(Continued)

(52) U.S. Cl.

CPC .............. *F24F 7/007* (2013.01); *E05B 65/44* (2013.01); *F25D 11/00* (2013.01); *F25D 17/042* (2013.01); *F25D 25/025* (2013.01); *E06B 7/22* (2013.01); *F24F 2007/001* (2013.01); *F25D 2317/043* (2013.01); *Y10T 74/2072* (2015.01); *Y10T 292/0947* (2015.04)

(58) Field of Classification Search

CPC ............................ F24F 7/007; F24F 2007/001
USPC ............................ 454/173; 62/441; 292/204
See application file for complete search history.

(56) References Cited

U.S. PATENT DOCUMENTS

| | | | |
|---|---|---|---|
| 2,425,816 | A | 8/1947 | Maxson |
| 2,894,845 | A | 7/1959 | Stoddard |

(Continued)

FOREIGN PATENT DOCUMENTS

| | | |
|---|---|---|
| JP | 3286984 | 12/1991 |
| JP | 10103849 | 4/1998 |

(Continued)

*Primary Examiner* — Helena Kasanovic
(74) *Attorney, Agent, or Firm* — Pearne & Gordon LLP

(57) ABSTRACT

A system for storing articles can have at least two operating modes. In the first mode, gases are evacuated from the system whereby the articles are stored at a pressure less than the pressure at the exterior of the system. In the second mode, gases are evacuated while the system is open to the admittance of gases from the exterior of the system whereby the articles are ventilated by the admitted gases. The system also can have a third operating mode wherein both the first and second modes are rendered inoperative. The storage system can function so that when the articles are stored in the first mode, gases are intermittently removed from the system whereby the pressure at which the articles are stored is maintained at less than the pressure at the exterior of the system. The storage system can be located in a refrigeration appliance such as a household refrigerator.

17 Claims, 5 Drawing Sheets

(51) Int. Cl.

| | |
|---|---|
| ***F25D 17/04*** | (2006.01) |
| ***F25D 25/02*** | (2006.01) |
| ***E05B 65/44*** | (2006.01) |
| ***F25D 11/00*** | (2006.01) |
| *E06B 7/22* | (2006.01) |
| *F24F 7/00* | (2006.01) |

(56) References Cited

U.S. PATENT DOCUMENTS

| | | | |
|---|---|---|---|
| 3,216,214 | A | 11/1965 | Gasbarro |
| 4,615,178 | A | 10/1986 | Badenhop |
| 5,046,332 | A | 9/1991 | Herrmann et al. |
| 5,095,717 | A | 3/1992 | Germi |
| 5,136,853 | A | 8/1992 | Girardon et al. |
| 5,157,940 | A | 10/1992 | Bertu et al. |
| 5,271,240 | A | 12/1993 | Detrick et al. |
| 5,575,453 | A | 11/1996 | Dion |
| 5,946,919 | A | 9/1999 | McKinney et al. |
| 6,090,422 | A | 7/2000 | Taragan et al. |
| 6,148,875 | A | 11/2000 | Breen |
| 6,511,138 | B1 | 1/2003 | Gardner et al. |
| 6,598,517 | B1 | 7/2003 | McCausland |
| 6,971,418 | B2 | 12/2005 | De Costa |
| 7,012,229 | B2 | 3/2006 | Kim |
| 8,140,190 | B2 | 3/2012 | Ferragut et al. |
| 2002/0083724 | A1 | 7/2002 | Tarlow et al. |
| 2006/0001274 | A1 | 1/2006 | Smith |
| 2006/0010890 | A1 | 1/2006 | Feinauer et al. |
| 2006/0090427 | A1 | 5/2006 | Hau et al. |
| 2007/0234754 | A1 | 10/2007 | Pimpatkar et al. |

FOREIGN PATENT DOCUMENTS

| | | |
|---|---|---|
| WO | 0171263 | 9/2001 |
| WO | 2005114070 | 1/2005 |
| WO | 2005114071 | 1/2005 |
| WO | 2005057103 | 6/2005 |

STORAGE SYSTEMS

CROSS-REFERENCE TO RELATED APPLICATIONS

This application is a divisional of U.S. application Ser. No. 11/758,141, filed on Jun. 5, 2007. The latter application is incorporated herein by reference.

FIELD OF THE INVENTION

The present invention relates to storage systems and more particularly to storage systems that can store articles under a variety of conditions, especially foodstuffs within refrigeration appliances such as household refrigerators.

BACKGROUND OF THE INVENTION

Storage systems of various types are available for storing articles under a variety of conditions. These storage systems often are self-contained, i.e., they have contained within themselves everything that is necessary to carry out the storage function. In other cases, the storage systems are housed in an environment that contributes to the storage function. For example, storage compartments can be contained within refrigeration appliances such as household refrigerators whereby the storing functions performed by the storage compartments are augmented by the temperatures maintained in the refrigerators.

In particular circumstances, storage compartments that maintain the foodstuffs contained within them under conditions that extend the period of time during which the foodstuffs remain fresh, such as where vacuums are maintained within the storage compartments, are abetted in their food-preservation function by keeping the foodstuffs at a temperature somewhat above freezing in the fresh food compartment of a refrigerator. By way of explanation and clarification, the word "vacuum" whenever used herein is not intended to only mean a space empty of matter but refers to any circumstance where the pressure is less than the ambient pressure.

BRIEF SUMMARY OF THE INVENTION

In accordance with one aspect of the invention, a system and method for storing articles have at least two modes of operation. In a first mode of operation, gases are evacuated from the system while the system is sealed from the admittance of gases from the exterior of the system. In a second mode of operation, gases are evacuated from the system while the system is open to the admittance of gases from the exterior of the system. In a related embodiment, the system can have a third mode of operation wherein either or both the first mode of operation and the second mode of operation are rendered inoperative. The invention also can comprise a system having only the first mode of operation with or without a mode of operation wherein the first mode of operation is rendered inoperative.

According to another aspect, the storage system and method can function so that when the articles are stored in the first mode of operation, the system is operative to intermittently remove additional gases from the system. In an embodiment of this aspect, the additional gases can be removed in accordance with a pre-selected time sequence or whenever the pressure at which the articles are stored exceeds a pre-selected pressure or both.

According to a further aspect, whenever access is to be had to the articles being stored in the first mode of operation, the system and method are operative to admit gases to the system.

According to another aspect, a storage system and method include a storage compartment the interior of which is adapted to be sealed off from the admittance of gases from outside the interior of the storage compartment. The system and method also include a gas evacuation system that is in gas flow communication with the interior of the storage compartment. The gas evacuation system is capable of functioning selectively in an active state wherein the gas evacuation system removes gases from the interior of the storage compartment and in an idle state wherein the gas evacuation system does not remove gases from the interior of the storage compartment. Also included in the storage system is a valve arrangement in gas flow communication with the interior of the storage compartment. The valve arrangement is capable of functioning in an open state wherein gases from outside the interior of the storage compartment can be admitted through the valve arrangement to the interior of the storage compartment and a closed state wherein gases from outside the interior of the storage compartment are prevented from being admitted to the interior of the storage compartment through the valve arrangement. The storage system and method can function so that the gas evacuation system can be selectively placed in an active state and the valve arrangement selectively, concurrently placed in a closed state, whereby gases will be removed from the interior of the storage.

In another embodiment, the gas evacuation system and method, additionally, can be selectively placed in an active state and the valve arrangement selectively, concurrently placed in an open state.

In still another aspect, the gas evacuation system and method, additionally, can be selectively placed in an idle state and the valve arrangement can be selectively, concurrently placed in an open state when the interior of the storage compartment is at a pressure below the pressure outside the interior of the storage compartment. In that case, the gas admitted to the interior of the storage compartment through the valve arrangement will cause the pressure within the interior of the storage compartment to increase so that the pressure within the interior of the storage compartment and the pressure outside the interior of the storage compartment will be substantially equalized.

In yet a further aspect, the gas evacuation system and method can be selectively placed in an intermittent active state following the reduction of the pressure in the storage compartment to a selected pressure and the valve arrangement selectively, concurrently placed in a closed state. In this case, additional gases are intermittently removed from the interior of the storage compartment and the pressure within the interior of the storage compartment maintained below the pressure at the outside of the storage compartment. The additional gases can be removed in accordance with a pre-selected time sequence or whenever the pressure at which the articles are stored exceeds a pre-selected pressure or both.

According to still another aspect, the invention concerns a storage system wherein the storage system includes a storage compartment including an external enclosure and a drawer having an interior portion for holding articles to be stored. The external enclosure and the drawer have cooperating elements that permit the drawer to be selectively withdrawn from within the external enclosure so as to provide access to the interior portion of the drawer and inserted within the external enclosure so that the interior portion of the drawer can be substantially entirely contained within the external enclosure. The external enclosure and the drawer have surfaces that engage one another when the interior portion of the drawer is substantially entirely contained within the external enclosure. A seal is positioned between the engaging surfaces of the external enclosure and the interior of the drawer. A gas evacuation system is in gas flow communication with the interior portion of the drawer for removing gases from the interior portion of the drawer when the interior portion of the drawer is sealed from the admittance of air. A valve arrangement is in gas flow communication with the interior portion of the drawer for selectively admitting gases to the interior portion of the drawer from outside the interior portion of the drawer and preventing the admittance of gases to the interior portion of the drawer from outside the interior portion of the drawer. And a latching mechanism can be provided for securing the drawer and the external enclosure together when the interior portion of the drawer is substantially entirely contained within the external enclosure and causing the engaging surfaces of the external enclosure and the drawer, along with the seal positioned between the engaging surfaces, to all come into engagement, whereby the engaging surfaces of the drawer and the external enclosure are prevented from disengaging and allowing gases from outside the interior of the drawer to enter the interior of the drawer. The latching mechanism can function to be disabled from securing the drawer and the external enclosure together when the gas evacuation system has removed sufficient gas from the interior portion of the drawer to establish a pressure differential between the interior portion of the drawer and the exterior of the external enclosure adequate to maintain the drawer and the external enclosure secured together.

In a particular embodiment, the seal can be attached at one of the engaging surfaces of the drawer and the external enclosure and the seal can include a first portion that first contacts the one of the engaging surfaces of the drawer and the external enclosure to which the seal is not attached when the engaging surfaces are brought together and a second portion, the first portion of the seal being more pliable than the second portion of the seal. The first portion of the seal can provide a soft initial seal between the drawer and the external enclosure as the engaging surfaces of the drawer and the external enclosure are first brought together in which case the second portion of the seal can provide a more secure seal as the engaging surfaces of the drawer and the external enclosure continue to be brought more closely together.

Also as a particular embodiment of this aspect, the latching mechanism can comprise a fixed retaining component mounted at one of the drawer and the external enclosure and a movable latching component mounted at the other of the drawer and the external housing. The fixed retaining component and the movable latching component can be located so that when the drawer is substantially entirely contained within the external enclosure, the movable latching component can latch onto the fixed retaining component and secure the drawer and the external enclosure together.

In all of the foregoing aspects and embodiments, the storage system can include a controller for controlling the operations of the gas evacuation system and the valve arrangement. Additionally, a user interface can be operatively connected to the controller for providing to the controller instructions concerning the operation of the gas evacuation system and the valve arrangement as input to the user interface by a user. Also in all of the foregoing aspects and embodiments the storage system can be installed in a refrigeration appliance such as the fresh food compartment of a refrigerator.

DETAILED DESCRIPTION OF THE INVENTION

Figure 1:
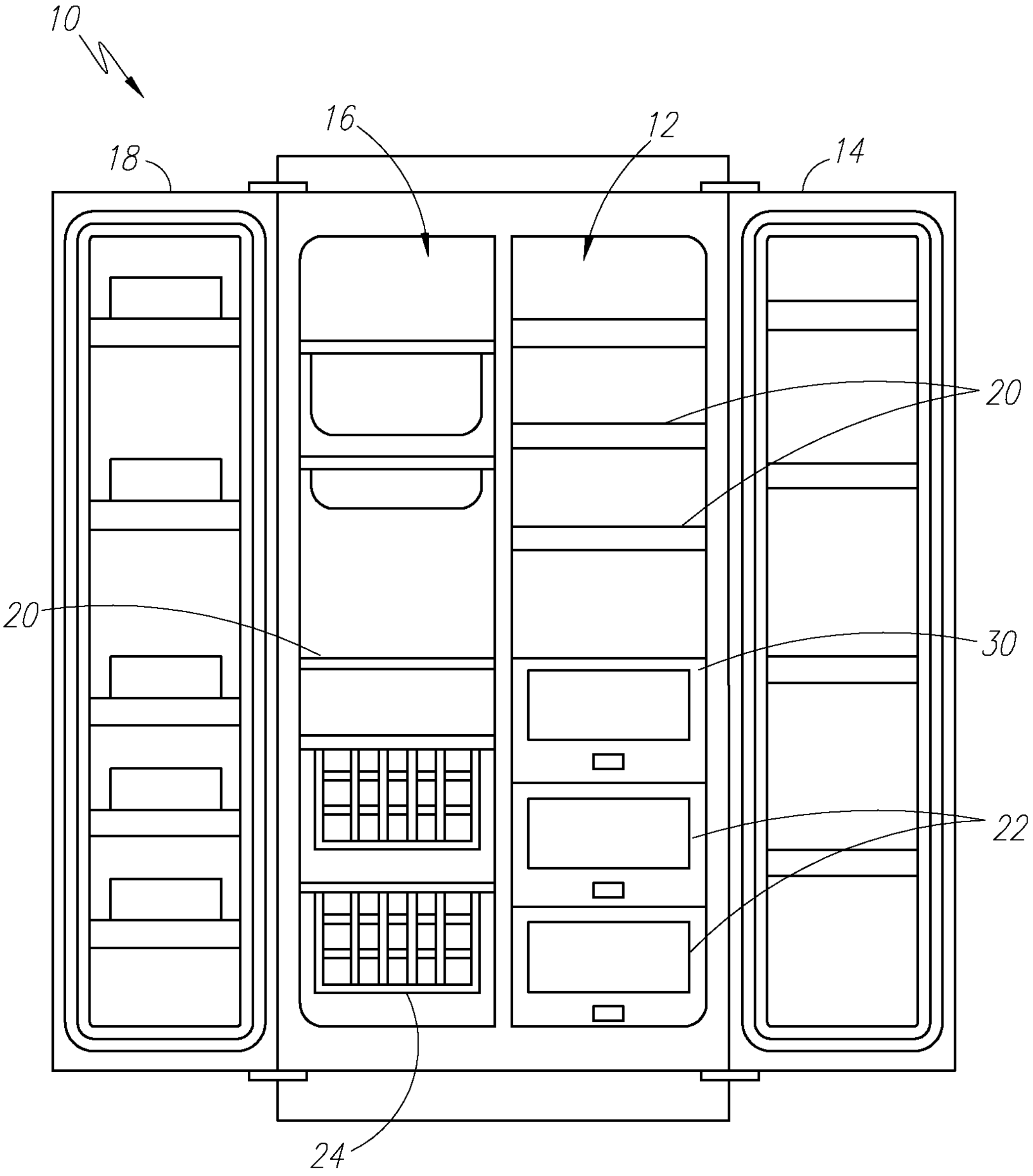
FIG. 1 is a front elevational view of a household refrigerator incorporating an embodiment of the storage system of the present invention, the doors of the refrigerator being shown in an open condition for the purpose of illustrating the interior of the refrigerator.

Referring now to the drawings, FIG. 1 shows a typical household refrigerator 10 comprising a fresh food compartment 12 and a freezer compartment 16. A door 14, shown in FIG. 1 as open, is mounted to the refrigerator body by hinges and serves to close the front of the fresh food compartment 12 as well as provide access to the interior of the fresh food compartment. A door 18, shown in FIG. 1 as open, also is mounted to the refrigerator body by hinges and serves to close the front of the freezer compartment 16 as well as provide access to the interior of the freezer compartment. The fresh food and freezer compartments can include a variety of shelves 20, closed drawers 22 and basket-like drawers 24 for storing articles of food and the like.

The refrigerator 10 also incorporates in the fresh food compartment 12 an embodiment 30 of the storage system of the invention. Although the storage system 30 of the invention is shown and described herein with reference to the incorporation of the storage system in the fresh food compartment of a household refrigerator, the system can be used in other circumstances such as, for example, in other types of refrigeration appliances and in other types of controlled environments, such as the freezer compartment of the refrigerator. Or the system can be used as a self-contained storage system outside a controlled environment. For example, the storage system of the invention can be located in a household kitchen cabinet. Additionally, the storage system 30 can be located at virtually any location in the fresh food compartment and more than one storage system can be provided.

According to a first embodiment, the storage system of the invention operates essentially only as a system for storing articles at a reduced pressure. In this mode of operation, referred to herein as a first mode of operation, gases are evacuated from the system while the system is sealed from the admittance of gases from the exterior of the system, whereby the articles being stored in the system are stored at a pressure less than the pressure at the exterior of the system. Articles stored in this manner are sometimes said to be stored under vacuum. It will be understood that when the pressure in the system is less than the pressure at the exterior of the system, less oxygen will be present in the system so that any deleterious effect of the oxygen on articles stored in the system will be mitigated.

According to a second embodiment, the storage system in addition to being capable of operating in the first mode of operation also is capable of operating in a second mode of operation. In the second mode of operation, gases are evacuated from the system while the system is open to the admittance of gases from the exterior of the system, whereby the articles being stored are ventilated by the gases admitted to the system. Typically, the gases admitted will comprise the ambient air. This arrangement is of advantage when the system is being used as a crisper in a refrigerator fresh food compartment.

In the first embodiment, the system can also have a mode of operation wherein the first mode of operation is rendered inoperative; and in the second embodiment, the system can have a third mode of operation wherein the first mode of operation and/or the second mode of operation are rendered inoperative.

The storage system of the first and second embodiments of the invention can function so that when the articles are stored in the first mode of operation, the system is operative to intermittently remove additional gases from the system, whereby the pressure at which the articles are being stored is maintained at less than the pressure at the exterior of the system. The removal of additional gases may be required for example because of the infiltration into the storage system of the gases or the generation of gases by the articles stored in the storage system. The additional gases can be removed in accordance with a pre-selected time sequence or the additional gases can be removed whenever the pressure at which the articles are stored exceeds a pre-selected pressure or both. Additionally, whenever access is to be had to the articles being stored in the first mode of operation, the system is operative to admit gases to the system, whereby the pressure within the system and the pressure outside the system are substantially equalized after which the articles can be conveniently accessed.

The present invention also involves a process wherein articles are placed in the interior of a storage compartment that is capable of storing the articles in any one of the at least two operational modes referred to in the preceding three paragraphs. The process involves selecting the operational mode, i.e., the first mode of operation or the second mode of operation, to be applied to the articles and applying to the articles the operational mode selected. When the first operational mode is selected and applied, gases are removed from the interior of the storage compartment while the interior of the storage compartment is sealed off to the exterior of the storage compartment so as to establish a selected pressure within the interior of the storage compartment that is less than the pressure at the exterior of the storage compartment. When the second operational mode is selected and applied, gases are admitted to the interior of the storage compartment while gases are concurrently removed from the storage compartment. In that case, the gases are ventilated through the storage compartment in contact with the articles stored in the storage compartment. Also in the process, gases can be admitted to the interior of the storage compartment so as to substantially equalize the pressure between the interior of the storage compartment and the exterior of the storage compartment, whereby access can be had to the interior of the storage compartment following the equalization of pressure between the interior of the storage compartment and the exterior of the storage compartment. Further, additional gases from the interior of the storage compartment can be intermittently removed following the establishment of the selected pressure in the storage compartment so as to substantially maintain the pressure in the interior of the storage chamber at a pressure less than the pressure at the exterior of the storage chamber. The additional gases can be intermittently removed from the interior of the storage compartment in accordance with a pre-selected time sequence a pre-selected value or both. The process also can involve selecting and applying a third operational mode that renders each of the first operational mode and the second operational mode inoperative.

Figure 2:
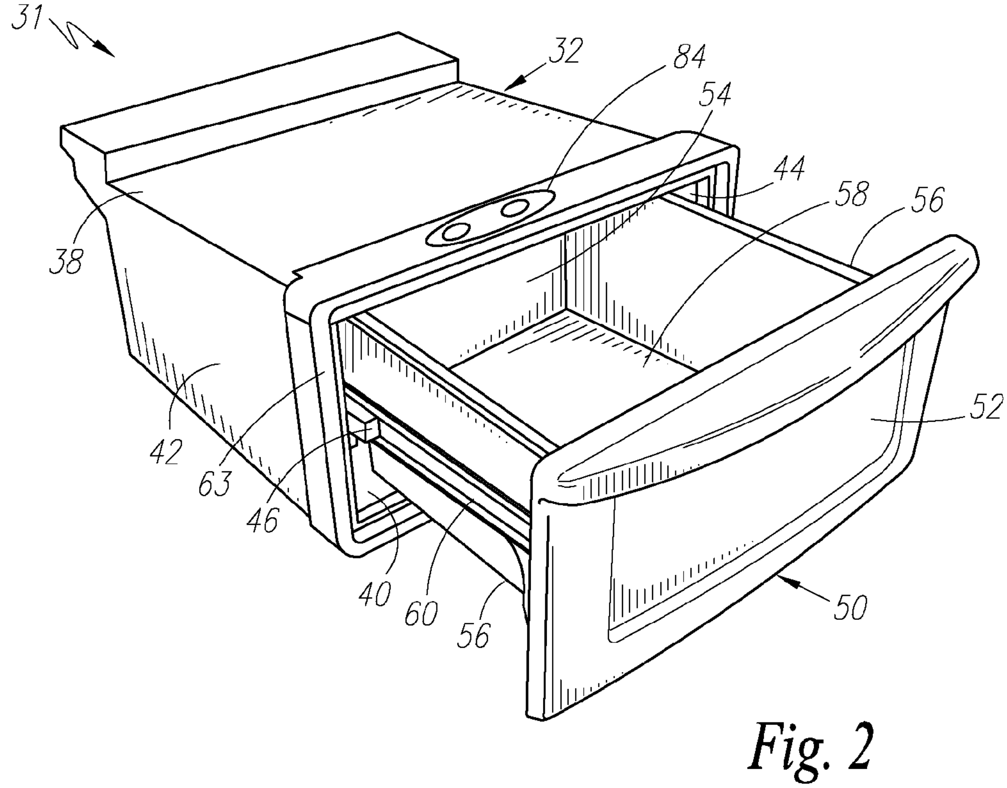
FIG. 2 is a perspective view of a storage compartment that includes a holding compartment or drawer contained within an external housing or enclosure according to an embodiment of the invention.
Figure 3:
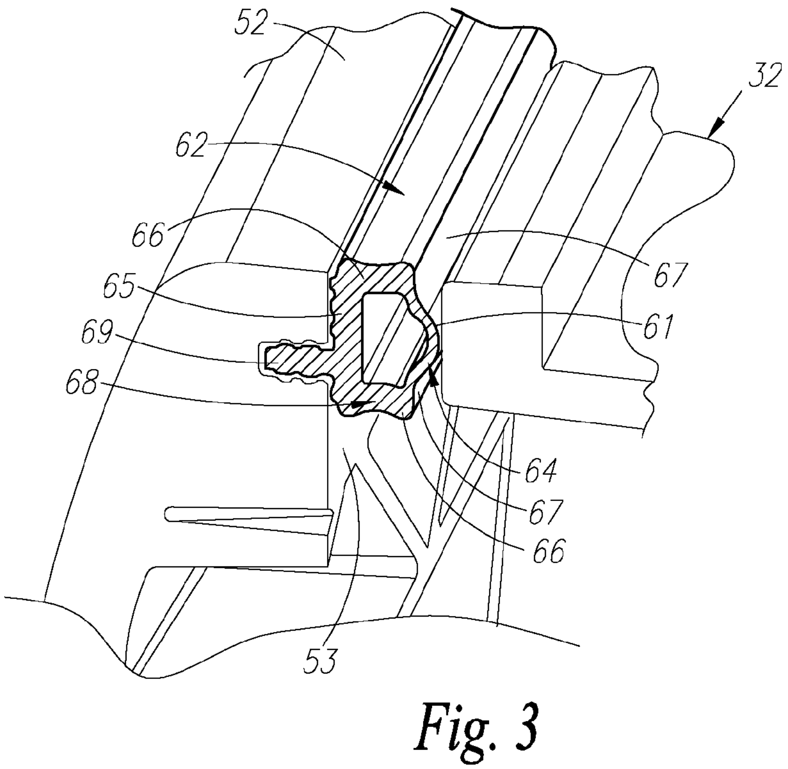
FIG. 3 is a partial perspective view of the holding compartment and enclosure of FIG. 2 that shows in cross-section an embodiment of a seal or gasket that can be employed to seal off the interior of the holding compartment from the exterior of the enclosure

The foregoing brief description of the storage system and process of the invention will now be further described with reference to FIGS. 2 through 4 of the drawings. FIG. 2 shows an embodiment of the storage system of the invention 30 as comprising a storage compartment 31 the interior of which is adapted to be sealed off from the admittance of gases from outside the interior of the storage compartment. The storage compartment 31 comprises an external housing or enclosure 32 and a holding compartment or drawer 50 for holding articles to be stored in the storage compartment. The external housing 32 includes an upper wall 38, a bottom wall 40, two opposed side walls 42, only one of which can be seen in FIG. 2, and a rear wall 36. The holding compartment 50 includes a front wall or panel 50, a rear wall 54, two opposed side walls 56 and a bottom surface 58.

The holding compartment 50 is movable between the interior of the external housing 32 and the exterior of the external housing through the opening 44 in the front of the external housing. More specifically, complementary sliding rails 46 and 60 of a type familiar to those having ordinary skill in the art are secured to the side walls 42 of the external enclosure 32 and the side walls 56 of the holding compartment 50, respectively. Thus, the external enclosure 32 and the drawer 50 have cooperating elements that permit the drawer 50 to be selectively withdrawn from within the external enclosure 32, so as to provide access to the interior portion of the drawer, and inserted within the external enclosure 32 so that the interior portion of the drawer 50 may be substantially entirely contained within the external enclosure.

When the interior portion of the drawer 50 is substantially entirely contained within the external enclosure 32, the surface 63 of the external enclosure and the surface 53 of the drawer engage one another. As best seen in FIG. 3, a seal or gasket 62 is positioned between the engaging surfaces 53 and 63 of the external enclosure 32 and the holding compartment or drawer 50, respectively, whereby the seal seals off the interior of the holding compartment from the exterior of the external housing or enclosure when the holding compartment 50 is substantially completely contained within the interior of the external housing 32. That is to say that the interior portion of the drawer 50 can be sealed from the admittance of gases from outside the interior portion of the drawer when the interior of the drawer is substantially entirely contained within the external enclosure 32. The engaging surface 53 extends around essentially the entire perimeter of the front wall 52 of the drawer 50 and the engaging surface 63 extends around essentially the entire perimeter of the opening 44 in the external enclosure 32.

The seal 62 is attached at one of the engaging surfaces of the drawer and the external enclosure. In the embodiment shown in the drawings, the seal is attached to the engaging surface 53 along essentially the entirety of the engaging surface 53. The attachment of the seal 62 to the engaging surface 53 is made by a seal projection 69 that is integral with the remainder of the seal and is held in place in a complementary slot in the engaging surface 53.

The seal 62 includes a first portion 64 that first contacts the one of the engaging surfaces of the drawer and the external enclosure to which the seal is not attached (engaging surface 63 in the embodiment shown in the drawings) when the engaging surfaces 53 and 63 are brought together. The seal also includes a second portion 68. The first portion 64 of the seal is more pliable than the second portion 68 and provides a soft initial seal between the drawer 50 and the external enclosure 32 as the engaging surfaces of the drawer and the external enclosure, 53 and 63 respectively, are first brought together. The second portion 68 of the seal provides additional strength and support and a more secure seal as the engaging surfaces of the drawer and the external enclosure continue to be brought more closely together such as under the influence of an increasing pressure differential between the pressure at the interior of the drawer 50 and the exterior of the external enclosure 32 as described more fully below.

The seal 62 comprises a tubular structure that is substantially rectangular in cross-section with the first portion 64 of the seal comprising one of the two longer sides of the rectangle and the second portion of the seal comprising the other of the two longer sides of the rectangle (indicated at 65 in FIG. 3) and the two shorter sides 66 of the rectangle. The seal 62 is attached to the engaging surface 53 of the drawer 50 at the other longer side 65 of the rectangle by means of the seal projection 69.

The first portion 64 of the seal 62 includes terminal portions 67, each of which is integral with a respective one of the two shorter sides 66 of the rectangle and the central portion 61 of the seal that joins the two terminal portions 67. The central portion 61 of the seal extends outwardly of the two terminal portions 67 of the seal, whereby the central portion of the seal comprises the portion of the seal that provides an initial seal between the drawer 50 and the external enclosure 32. The first portion 61 of the seal is thinner than the second portion 68 of the seal in the embodiment of the seal shown in the drawings although this does not have to be the case. What is the case is that the first portion 61 of the seal is more pliable than the second portion 68 of the seal.

Figure 4:
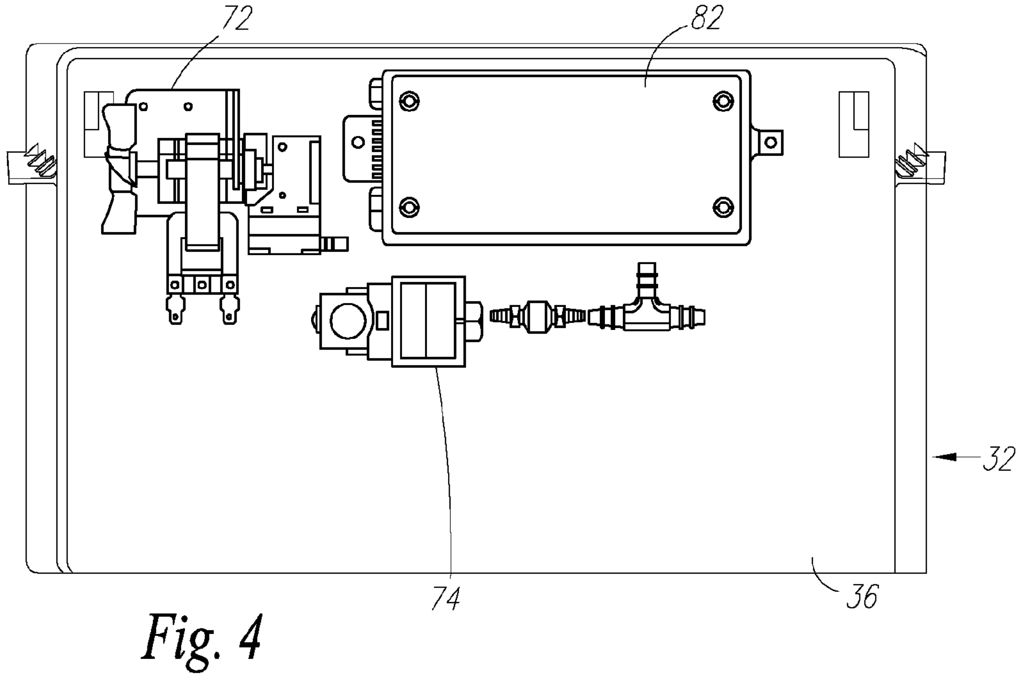
FIG. 4 is a rear elevational view of the storage compartment of FIGS. 2 and 3 that shows the gas evacuation system and valve arrangement installed at the rear wall of the external enclosure as well as the main-control board for the controller.

The storage system of the invention also includes a gas evacuation system 72 that is mounted at the rear surface 36 of the external enclosure 32 as shown in FIG. 4. The gas evacuation system can comprise what is typically referred to as a vacuum pump. The gas evacuation system 72 is in gas flow communication with the interior of the storage compartment 31. More specifically, the gas evacuation system 72 is in gas flow communication with the interior of the holding compartment or drawer 50 for removing gases from the interior of the holding compartment when the gas evacuation system is in an active state, that is when the gas evacuation system is running. The gas evacuation system 72 is capable of functioning selectively in an active state wherein the gas evacuation system removes gases from the interior of the storage compartment 31, including the holding compartment 52, and in an idle state wherein the gas evacuation system 72 does not remove gases from the interior of the storage compartment including the holding compartment.

Also included in the storage system 30 is a valve arrangement 74 that is mounted at the exterior of the storage compartment at the rear wall 36 of the external housing 32. The valve arrangement 74 is in gas flow communication with the interior of the storage compartment 31 and, specifically, the interior of the holding compartment or drawer 50. The valve arrangement 74 can comprise any type of valve known to those of ordinary skill in the art that is capable of functioning in an open state wherein gases from outside the interior of the storage compartment 31 can be admitted through the valve arrangement to the interior of the storage compartment and a closed state wherein gases from outside the interior of the storage compartment 31 are prevented from being admitted to the interior of the storage compartment through the valve arrangement. For example, the valve arrangement 74 can comprise a solenoid operated valve in the nature of a pressure release valve.

In one aspect, the storage system 30 can function so that the gas evacuation system 72 can be selectively placed in an active state and the valve arrangement 74 selectively, concurrently placed in a closed state, whereby gases will be removed from the interior of the storage compartment 31 and the pressure within the interior of the storage compartment will be reduced to a selected pressure less than the pressure outside the interior of the storage chamber when the interior of the storage chamber is otherwise sealed off from the admittance of gases from outside the storage compartment. What that selected pressure may be depends on a variety of factors but usually will be limited by the size of the evacuation device used to remove gases from the interior of the system. When the storage system 30 functions in this manner, the articles stored in the storage compartment 31 will be stored under vacuum wherein less oxygen will be available to react with the stored articles.

The gas evacuation system 72, additionally, can be selectively placed in an idle state and the valve arrangement 74 can be selectively, concurrently placed in an open state when the interior of the storage compartment 31 is at a pressure below the pressure outside the interior of the storage compartment as described in the preceding paragraph. In that case, the gas admitted to the interior of the storage compartment 31 through the valve arrangement 74 will cause the pressure within the interior of the storage compartment to increase so that the pressure within the interior of the storage compartment and the pressure outside the interior of the storage compartment will be substantially equalized. This makes it more convenient to access the articles within the storage compartment.

In another aspect, the gas evacuation system 72 can be selectively placed in an intermittent active state following the reduction of the pressure in the storage compartment 31 to a selected pressure as described above and the valve arrangement 74 selectively, concurrently placed in a closed state whereby the articles in the storage compartment are stored under vacuum. In this case, additional gases are intermittently removed from the interior of the storage compartment 31 and the pressure within the interior of the storage compartment is maintained below the pressure at the outside of the storage compartment and the conditions of a vacuum preserved. Such additional gases can be generated, for example, by the articles, such as foodstuffs, stored within the storage compartment. In a particular instance, the additional gases can comprise ethylene gas given off by fruits and vegetables stored in the storage compartment 31. The additional gases can be removed in accordance with a pre-selected time sequence or the additional gases can be removed whenever the pressure at which the articles are stored exceeds a pre-selected pressure or both.

In addition to functioning as a vacuum compartment as described in the several immediately preceding paragraphs, the storage compartment 31 can function as a crisper for fruits and vegetables for example in the case of the second embodiment of the invention. In that case, the gas evacuation system 72 is selectively placed in an active state and the valve arrangement 74 selectively, concurrently placed in an open state, whereby the gases admitted to the interior of the storage compartment 31 through the valve arrangement 74 are ventilated through the interior of the storage compartment. The ventilation can provide a variety of salutary effects. For example, humidity can build up in the storage compartment 31 and the excess humidity can be removed by the gas evacuation system 72 while fresh air is admitted to the storage compartment through the valve arrangement 74.

Thus, as contemplated by the second embodiment of the invention, the invention concerns a storage system 30 adapted to be located within a refrigeration appliance 10 wherein the storage system comprises a storage compartment 31 including an external enclosure 32 and a drawer 50 having an interior portion for articles to be stored. The interior portion of the drawer 50 can be sealed from the admittance of gases when the interior portion of the drawer is substantially entirely contained within the external enclosure 32. A gas evacuation system 72 is in gas flow communication with the interior portion of the drawer 50 for removing gases from the interior portion of the drawer when the interior portion of the drawer is sealed from the admittance of gases. A valve arrangement 74 is in gas flow communication with the interior portion of the drawer 50 for selectively admitting gases to the interior portion of the drawer from outside the interior portion of the drawer and preventing the admittance of gases to the interior portion of the drawer from outside the interior portion of the drawer.

The embodiment of the storage system shown in the drawings includes an electronic-control system including a controller 82 for controlling the operations of the gas evacuation system 72 and the valve arrangement 74, as those operations have been described above, as well as for controlling the latching mechanism 90. Any suitable type of controller known in the art may be used. The controller 82 is located on the rear wall 36 of the external housing 32, as shown in FIG. 4. A user interface 84 located on the top surface 38 of the external housing 32 near the front of the housing, as shown in FIG. 2, is operatively connected to the controller 82 for providing to the controller instructions concerning the operation of the gas evacuation system 72 and the valve arrangement 74 as input to the user interface by a user. The user can use the user interface to switch between the modes of operation of the storage system described above by entering an appropriate command into the user interface. More specifically, when the user enters a command into the user interface 84, such as, for example when the user wishes to store articles in the storage compartment under vacuum, the command is communicated to the controller 82. The controller 82 then processes the command and sends a corresponding signal to the gas evacuation system 72 and the valve arrangement 74. The gas evacuation system and the valve arrangement then function in the mode selected by the user. If the user selects the vacuum mode and subsequently wishes to access the stored articles, the user enters an appropriate command at the user interface and the controller, in response, will cause the gas evacuation system to be placed in an idle mode and cause the valve arrangement to be opened whereby the pressure within the storage compartment and pressure outside the compartment will be equalized.

The controller also can be programmed so as to control the functioning of the gas evacuation system and valve arrangement for the purpose of intermittently removing additional gases from the interior of the storage chamber after the storage chamber has been placed in the vacuum mode. In cases where the additional gases are to be intermittently removed in accordance with a prescribed time sequence the controller can include an appropriate timing mechanism that causes the controller to intermittently activate the gas evacuation system based on that time sequence. In instances where additional gases are to be intermittently removed whenever the pressure in the storage compartment exceeds a pre-selected value, a pressure sensing device can be incorporated into the storage compartment and connected to the controller so as to cause the controller to activate the gas evacuation system whenever the pre-selected pressure level is reached. Additionally, the timing mechanism and the pressure sensing device can be used together and the controller programmed so that additional gases are removed from the storage compartment in accordance with both the prescribed timing sequence and the pre-selected pressure level.

The user interface also provides for selectively inputting instructions to the controller 82 for placing each of the gas evacuation system 72 and the valve arrangement 74 in a non-functioning mode whereby the gas evacuation system and the valve arrangement are shut down. The controller as well as some or all of the other components shown as mounted to rear wall 36 of the external enclosure 32 can be located elsewhere inside or outside the refrigerator 10. The functioning relationships between the controller and the latching mechanism are discussed below.

The storage system of the invention can rely entirely on the pressure differential between the interior of the holding compartment and the pressure outside external enclosure for maintaining the engaging surfaces of the holding compartment and the external enclosure and the seal positioned between those two surfaces in tight contact so as to seal off the interior portion of the holding compartment from the admittance of gases. In that case it is important that the first portion of the seal 62 be sufficiently pliable to seal off the interior of the holding compartment so as to permit the pressure within the holding compartment to be reduced and a pressure differential established. However, the storage system 30 can include in addition a latching mechanism for securing the holding compartment or drawer 50 to the external enclosure or housing 32 when the holding compartment is substantially completely contained within the interior of the external enclosure. Embodiments of such a latching mechanism are shown in the drawings in FIGS. 5 through 9 of the drawings.

The function of the latching mechanism is to secure the holding compartment 50 to the external enclosure 32 when the holding compartment is substantially completely contained within the interior of the external housing so as to initially maintain in place the seal sealing off the interior of the holding compartment from the exterior of the external housing. Thus, the latching mechanism can provide the initial force required to seal the drawer and the external housing together whereby gases are prevented from entering the drawer interior. As a result, when the gas evacuation system 72 is in an active state and the valve arrangement 74 is in a closed state, the pressure within the interior of the holding compartment 50 can be reduced to a selected pressure less than the pressure at the exterior of the external housing 32. The latching mechanism can function in a manner so as to be inoperative to secure the holding compartment 50 to the external housing 32 when the pressure differential between the pressure within the interior of the holding compartment and the pressure at the exterior of the external housing is adequate to prevent the holding compartment from becoming disengaged from the external housing so as to prevent opening of the seal that seals off the interior of the holding compartment 50 from the exterior of the external housing 32. As a result, when one wishes to access the interior of the holding compartment 50 when the interior of the holding compartment is at a reduced pressure, it is only necessary to allow gas to enter the holding compartment 50 through the valve arrangement 74 so as to equalize the pressure within the holding compartment and the pressure at the exterior of the external housing. And it is not necessary to wait for the latching mechanism to be freed.

As noted, the latching mechanism is provided for securing the drawer 50 and the external enclosure 32 together when the interior portion of the drawer is substantially entirely contained within the external enclosure. As a result, the engaging surfaces of the external enclosure and the drawer, 63 and 53 respectively, along with the seal 62 positioned between the engaging surfaces, all come into tight engagement, whereby the engaging surfaces of the drawer and the external enclosure are prevented from disengaging and allowing gases from outside the interior of the drawer 50 to enter the interior of the drawer. The latching mechanism functions so as to be disabled from securing the drawer 50 and the external enclosure 32 together when the gas evacuation system 72 has removed sufficient gas from the interior portion of the drawer to establish a pressure differential between the interior portion of the drawer and the exterior of the external enclosure adequate to maintain the drawer and the external enclosure secured together.

In the first embodiment of the latching mechanism shown in FIGS. 5, 6, 7 and 9, the latching mechanism 90 comprises a fixed retaining component 122 mounted at one of the drawer 50 and the external enclosure 32 and a movable latching component 91 mounted at the other of the drawer and the external housing. In the embodiment shown in the drawings, the fixed retaining component in the form of the tab 122 is mounted to the rear of a side wall 56 of the drawer 50 and a complementary movable latching component 91 is mounted to the interior of a side wall 42 of the external housing 32. The fixed retaining component 122 and the movable latching component 91 are located in relation to one another so that when the drawer 50 is substantially entirely contained within the external enclosure 32, the movable latching component 91 can latch onto the fixed retaining component 122 and secure the drawer and the external enclosure together.

Figure 5:
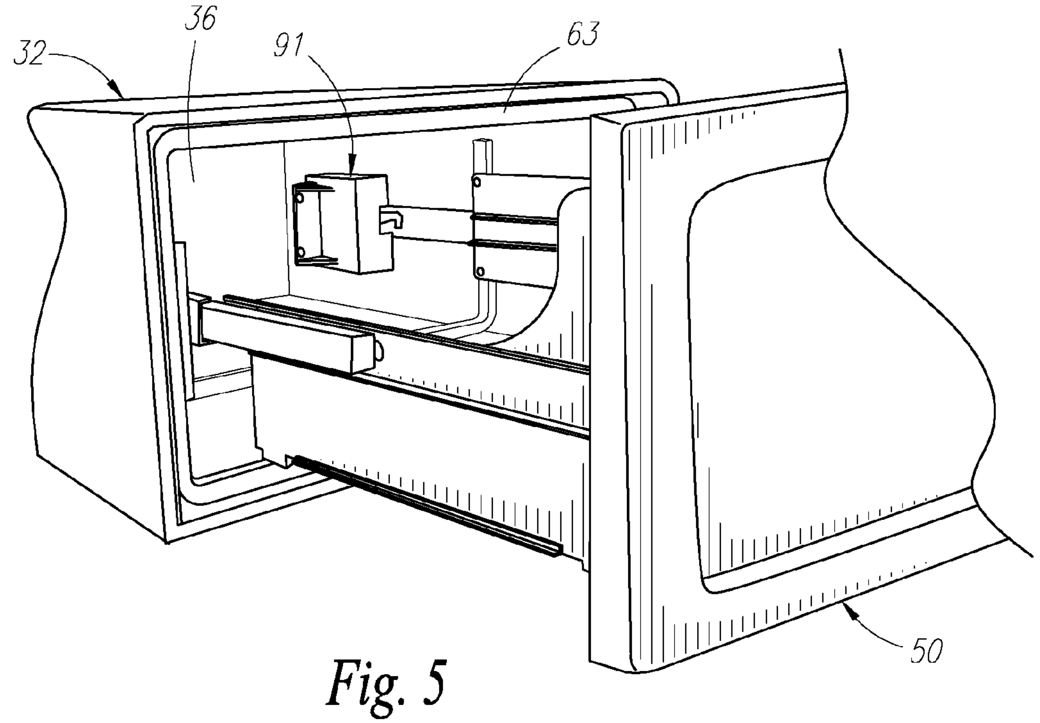
FIG. 5 is a partial perspective view of the interior of the storage compartment wherein certain of the components of the storage compartment are broken away to show an embodiment of the latching mechanism that can be employed to selectively secure the holding compartment to the external enclosure.
Figure 9:
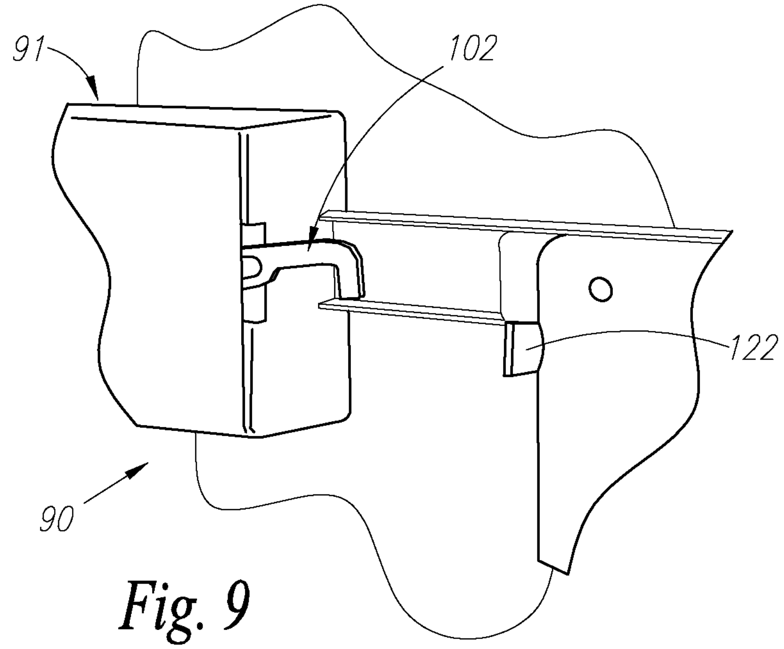
FIG. 9 is a partial perspective view of an embodiment of the latching mechanism showing both the movable latching component and the fixed latching component.

A latching mechanism can be provided at only one side of the drawer and external enclosure or at each of both sides of the drawer and the external enclosure. FIGS. 5 and 9 show only one latching mechanism but two latching mechanisms can be incorporated into the storage compartment. In FIGS. 5 and 9, portions of the rear and side walls of the drawer and external enclosure have been broken away and are not shown so that the latching mechanism may be more readily seen.

Figure 6:
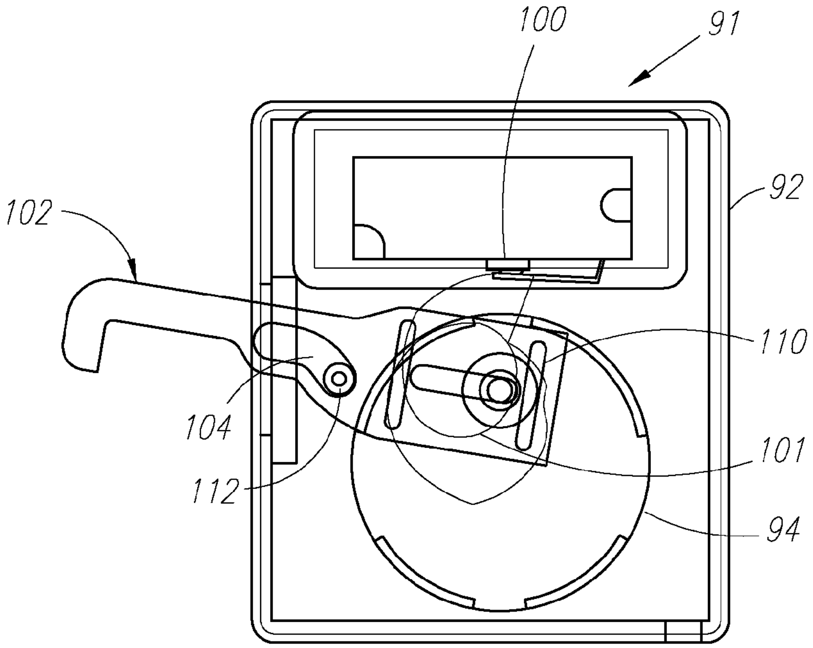
FIG. 6 is an elevational view of a first embodiment of the movable latching component of the latching mechanism shown in the attitude where the movable latching component is disengaged from securing together the holding compartment and the external enclosure.
Figure 7:
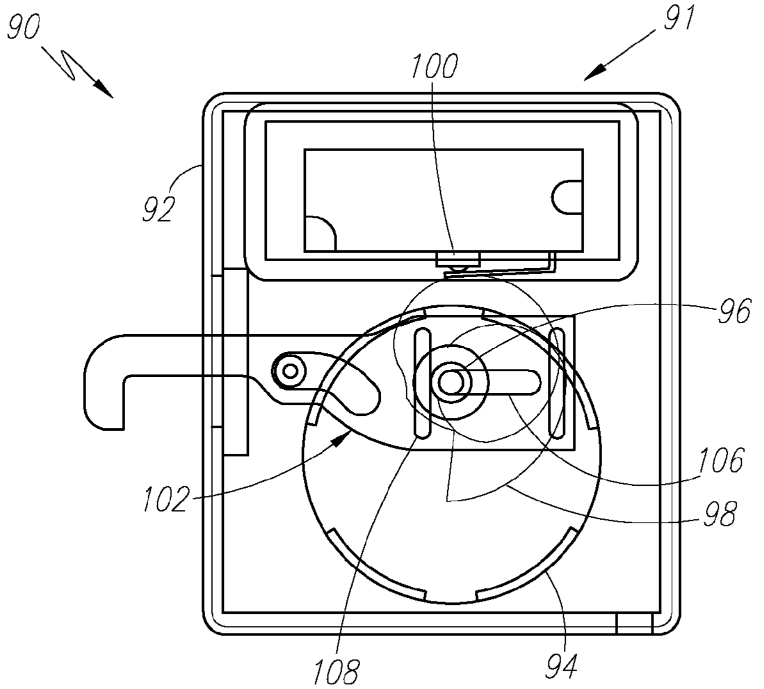
FIG. 7 is an elevational view of the first embodiment of the movable latching component of the latching mechanism shown in the attitude where the movable latching component functions to secure the holding compartment and the external enclosure together.

The movable latching component includes a hook-shaped element 102 that is contained within a housing 92, the hook-shaped element being movable between a position where it is free of the fixed retaining component 122 as shown in FIG. 6 and a position where the hook-shaped element 102 is attached to the fixed retaining component 122 as shown in FIG. 7. A driving arrangement also contained within the housing 92 is operatively associated with the hook-shaped element 102 for moving the hook-shaped element between a position where the hook-shaped element is free of the fixed retaining component and a position where the hook-shaped element is attached to the fixed retaining component. The driving arrangement includes a motor 94 operatively associated with the hook-shaped element 102, and the motor is provided with a drive shaft 96. The hook-shaped element includes two spaced-apart abutments 108 and 110 and the driving arrangement includes a cam 101 located between the two spaced-apart abutments. The motor drive shaft 96 is attached to the cam 101 so as to rotate the cam between the two abutments 108 and 110 and cause the hook-shaped element 102 to move between a position toward the fixed retaining component 122 and a position away from the fixed retaining component. A pivot slot 106 in the hook-shaped element 102 through which the drive shaft 96 extends allows for this movement. A fixed pin 112 attached to the housing 92 is located in a guide slot 104 in the hook-shaped element 102, and the guide slot has a configuration such that, as the rotating cam 101 moves the hook-shaped element from a position away from the fixed retaining component 122 to a position toward the fixed retaining component, the fixed pin 112 in the guide slot 104 causes the hook-shaped element to move from a position where it is free of the fixed retaining element as shown in FIG. 6 to a position where it is latched to the fixed retaining element as shown in FIG. 7. A flange 98 is attached to the cam 101 so as to rotate with the cam, the flange having two contact points, one contact point adapted to contact the switch 100 when the hook-shaped element 102 is in the position shown in FIG. 6 and the other contact point adapted to contact the switch 100 when the hook-shaped element 102 is in the position shown in FIG. 7 as further described below.

The operation of the latching mechanism 90 is as follows. When the drawer 50 is substantially entirely contained within the external housing 32 and a user initiates the first operational or vacuum mode through the user interface 84, the controller 82 activates the latching mechanism 90 by supplying power to the motor 94 whereupon drive shaft 96 is rotated so as to rotate the cam 101 between the abutments 108 and 110. Initially at this point, the movable latching component 91 is in the attitude shown in FIG. 6 and as the cam 101 rotates, it pushes against the abutment 110 and forces the hook-shaped element 102 to move in a direction away from the fixed latching element 122 and finally assume the rearward position shown in FIG. 7. At the same time as this movement is occurring, the hook-shaped element 102 guided by the interaction of the pin 112 and the guide slot 104 will move from the upward attitude shown in FIG. 6 to the final position shown in FIG. 7. The combination of these two movements of the hook-like element 102 downward and backward results in the hook-shaped element latching on to the tab 122 and pulling the drawer 50 and the external housing 32 into tight engagement. When the moveable latching component 91 is in the position shown in FIG. 6, the flange 98 that is attached to the cam 101 will have rotated with the cam and will have reached a position where one of its contact points will have activated switch 100 thereby shutting off power to the motor 94. At the same time, the controller 82 is informed that the drawer 50 is secured to the external housing 32 and the controller will cause the gas evacuation system 72 to be activated so that gases will be removed from the interior of the drawer 50. The latching mechanism continues to secure the drawer 50 to the external housing 32 until the pressure in the drawer reaches a pre-selected level that is adequate for the resulting pressure differential between the pressure within the drawer and the pressure at the exterior of the external housing to maintain the drawer secure to the external housing. When the pre-selected pressure level is reached, as sensed by a pressure sensor for example located within the drawer 50, the information is passed on to the controller 82 that then activates the motor 94 so as to rotate the shaft 96 in the opposite direction. At this point, the cam 101 pushes against abutment 108 and forces the hook-shaped element 102 forward while at the same time the cooperative functioning of the fixed pin 112 and the guide slot 104 moves the hook-shaped element upwardly. As a result, the hook-shaped element moves from the position shown in FIG. 7 to the position shown in FIG. 6, whereby the latching mechanism becomes separated, that is the hook-shaped element becomes disengaged from the tab. When the hook-shaped latching element has reached the position shown in FIG. 6, the opposite contact point on the flange 98 will engage the switch 100 causing the switch to turn off the motor. Disengaging the latching mechanism in this way allows the user to more quickly access the contents of the drawer at a later time as desired. Access can be gained to the interior of the drawer by the user simply inputting to the user interface 84 directions to allow the valve arrangement 74 to admit gases into the drawer interior and equalize the pressure in the drawer and the pressure at the outside of the external enclosure. It is not necessary at that time to also disengage the latching mechanism.

Figure 8:
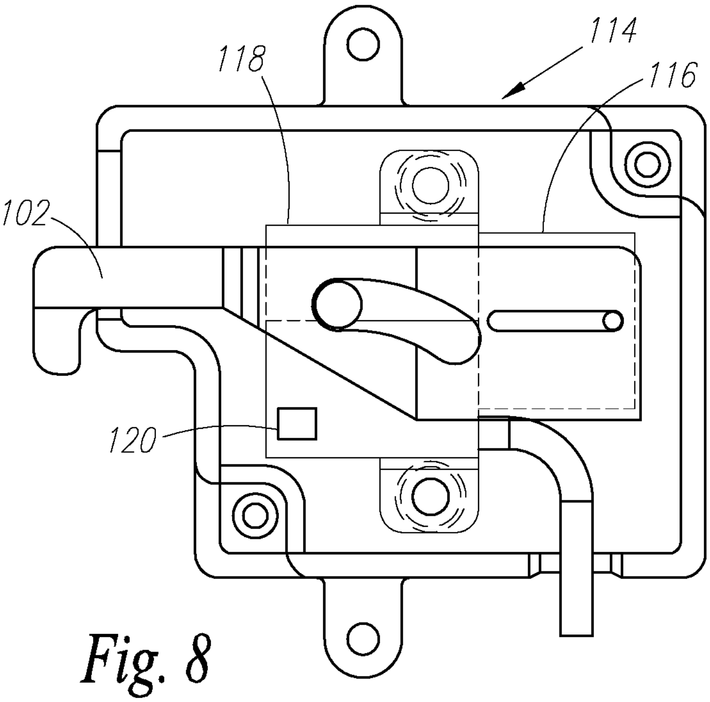
FIG. 8 is an elevational view of a second embodiment of the movable latching component of the latching mechanism shown in the attitude where the movable latching component functions to secure the holding compartment and the external enclosure together.

An alternate embodiment of the latching mechanism 91 is shown in FIG. 8. In this embodiment, the latching mechanism makes use of a piston-type movable latching component 114 that is shown in FIG. 8 to be in a closed position wherein the hook-shaped element 102 is latched to the tab 122. The piston-like latching component functions in a manner similar to the movable latching component 91 described above. The primary difference between the two relates to the driving arrangement for each. With the movable latching component 114, a piston 116 actuates the latching component. The piston 116 is operatively attached to a piston cylinder 118 inside of which is located an electric heater 120. The piston cylinder is also filled with a liquid.

When the movable latching component 114 is activated, the electric heater 120 is turned on and heats the liquid in the piston cylinder. The liquid vaporizes and the resulting pressure created by the vaporizing liquid pushes the piston 116 in a direction such that the hook-shaped element 102 moves from a position where the latching component 114 is unlatched to a position where the latching component is latched to the fixed latching component 122 and the external housing 32 is secured to the holding compartment 50. When the pressure differential between the interior of the holding compartment and the exterior of the external housing becomes adequate to maintain the holding compartment and the external housing secured to one another, the controller 82 interrupts the power to the electric heater 120. As the liquid in the piston cylinder cools and the pressure inside the piston cylinder 118 decreases, a bias spring not shown moves the piston 116 to its original position, thereby moving the movable latching component 114 to an open position whereby the fixed latching component and the movable latching component are not latched to one another.

It will be understood from the foregoing description of the latching mechanism that the latching mechanism can have application in a variety of situations where it is desired to selectively secure together two units and allow the units to be disengaged from one another where the first unit and the second unit are movable relative to one another. In such a case, the fixed retaining component of the latching mechanism is mounted at one unit and the movable latching component of the latching mechanism is mounted at the other unit. The latching mechanism in this context functions in the same manner as described above with reference to the drawer and the external enclosure.

Based on the foregoing description of the invention, it will be understood that the invention includes a storage process that comprises placing articles in the interior of a storage compartment 31, sealing the interior of the storage compartment to the admittance of gases from the exterior of the storage compartment and removing gases from the interior of the storage compartment so as to establish a pressure differential between the pressure within the interior of the storage compartment and the pressure at the exterior of the storage compartment. The pressure differential between the pressure within the interior of the storage compartment and the pressure at the exterior of the storage compartment is substantially maintained by intermittently removing additional gases from the interior of the storage compartment. That is to say that pressure differential will be maintained so that the latching mechanism will not be reactivated. Gases can be admitted to the interior of the storage compartment so as to substantially equalize the pressure between the interior of the storage compartment and the exterior of the storage compartment, whereby access can be had to the interior of the storage compartment following the equalization of pressure between the interior of the storage compartment and the exterior of the storage compartment. Further, the articles to be stored can be placed in the interior of the storage compartment that includes an external housing 32 and a holding compartment 50 for holding the articles. The holding compartment is movable between the interior of the external housing and the exterior of the external housing. The interior of the holding compartment is sealed to the admittance of gases from the exterior of the external housing when the holding compartment is substantially contained within the interior of the external housing. Gases are removed from the interior of the holding compartment so as to establish a pressure differential between the pressure within the interior of the holding compartment and the pressure at the exterior of the external housing, and the pressure differential between the pressure within the interior of the storage compartment and the pressure at the exterior of the storage compartment is substantially maintained by intermittently removing additional gases from the interior of the storage compartment. Gases can be admitted to the interior of the storage compartment so as to substantially equalize the pressure between the interior of the storage compartment and the exterior of the storage compartment, whereby access can be had to the interior of the storage compartment following the equalization of pressure between the interior of the storage compartment and the exterior of the storage compartment. The interior of the holding compartment 50 initially can be sealed to the admittance of gases from the exterior of the external housing 32 by securing the holding compartment to the external housing by means of a latching mechanism, whereby gases from the exterior of the external housing are prevented from entering the interior of the holding compartment. The latching mechanism is released when the pressure differential between the pressure within the interior of the holding compartment and the pressure at the exterior of the external housing is adequate to secure the holding compartment to the external housing and prevent gases from entering the interior of the holding compartment from the exterior of the external housing.

What is claimed is:

1. A storage system comprising:

a storage compartment the interior of which is adapted to be selectively opened to and sealed off from the admittance of gases from outside the interior of the storage compartment;

a gas evacuation system in gas flow communication with the interior of the storage compartment, the gas evacuation system being capable of functioning selectively in an active state wherein the gas evacuation system removes gases from the interior of the storage compartment and in an idle state wherein the gas evacuation system does not remove gases from the interior of the storage compartment;

an automatically controlled valve arrangement, separate from the gas evacuation system, in gas flow communication with the interior of the storage compartment, the valve arrangement being capable of functioning selectively only in an open state wherein gases from outside the interior of the storage compartment can be admitted through the valve arrangement to the interior of the storage compartment and a closed state wherein gases from outside the interior of the storage compartment are prevented from being admitted to the interior of the storage compartment through the valve arrangement, wherein the gas evacuation system can be selectively placed in an active state and the valve arrangement selectively, concurrently placed in a closed state, whereby gases are removed from the interior of the storage compartment and pressure within the interior of the storage compartment is reduced to a selected pressure less than pressure outside the interior of the storage compartment when the interior of the storage compartment is otherwise sealed off from the admittance of gases from outside the interior of the storage compartment, wherein the storage compartment comprises an external housing and a holding compartment for holding articles to be stored in the storage compartment, an interior of the holding compartment being in gas flow communication with the gas evacuation system and the valve arrangement, and the holding compartment being movable between an interior of the external housing and an exterior of the external housing, and a seal sealing off the interior of the holding compartment from the exterior of the external housing when the holding compartment is substantially completely contained within the interior of the external housing, wherein the holding compartment and the external housing have surfaces that engage one another when the interior of the holding compartment is substantially entirely contained within the external housing and the seal is positioned between the engaging surfaces of the holding compartment and the external housing, and wherein the seal is attached at one of the engaging surfaces of the holding compartment and the external housing and includes a first portion that first contacts the one of the engaging surfaces of the holding compartment and the external housing to which the seal is not attached when the engaging surfaces are brought together and a second portion, the first portion of the seal being more pliable and thinner than the second portion of the seal the automatically attachable and releasable latching mechanism for securing the holding compartment and the external housing together.

2. The storage system of claim 1 wherein the first portion of the seal provides a soft initial seal between the holding compartment and the external housing as the engaging surfaces of the holding compartment and the external housing are first brought together and the second portion of the seal provides a more secure seal as the engaging surfaces of the holding compartment and the external housing continue to be brought more closely together.

3. The storage system of claim 2 wherein the seal comprises a tubular structure that is substantially rectangular in cross-section with the first portion of the seal comprising one of the two longer sides of the rectangle and the second portion of the seal comprising the other of the two longer sides of the rectangle and the two shorter sides of the rectangle, and the seal is attached to one of the engaging surfaces of the holding compartment and the external housing at the other of the two longer sides of the rectangle.

4. The storage system of claim 3 wherein the first portion of the seal includes terminal portions, each of which is integral with a respective one of the two shorter sides of the rectangle and a central portion that joins the two terminal portions, the central portion extending outwardly of the two terminal portions, whereby the central portion comprises the portion of the seal that provides an initial seal between the holding compartment and the external housing.

5. The storage system of claim 1 wherein, additionally, the gas evacuation system can be selectively placed in the idle state and the valve arrangement selectively, concurrently placed in the open state when the interior of the storage compartment is at a pressure below the pressure outside the interior of the storage compartment, whereby the gas admitted to the interior of the storage compartment through the valve arrangement causes the pressure within the interior of the storage compartment to increase so that the pressure within the interior of the storage compartment and the pressure outside the interior of the storage compartment is substantially equalized.

6. The storage system of claim 5 wherein the latching mechanism for securing the holding compartment to the external housing when the holding compartment is substantially completely contained within the interior of the external housing so as to initially maintain in place the seal sealing off the interior of the holding compartment from the exterior of the external housing, the gas evacuation system is in the active state and the valve arrangement is in the closed state, whereby the pressure within the interior of the holding compartment can be reduced to a selected pressure less than the pressure at the exterior of the external housing.

7. The storage system of claim 6 wherein the latching mechanism is inoperative to secure the holding compartment to the external housing when the pressure differential between the pressure within the interior of the holding compartment and the pressure at the exterior of the external housing is adequate to prevent the holding compartment from becoming disengaged from the external housing and prevent opening of the seal sealing off the interior of the holding compartment from the exterior of the external housing.

8. A storage system adapted to be located within a refrigeration appliance, the storage system comprising:

a storage compartment including an external enclosure and a holding compartment having an interior portion for holding articles to be stored, the external enclosure and the holding compartment having cooperating elements that permit the holding compartment to be selectively withdrawn from within the external enclosure so as to provide access to the interior portion of the holding compartment and inserted within the external enclosure so that the interior portion of the holding compartment may be substantially entirely contained within the external enclosure, and the external enclosure and the holding compartment having surfaces that engage one another when the interior portion of the holding compartment is substantially entirely contained within the external enclosure;

a seal positioned between the engaging surfaces of the external enclosure and the interior of the holding compartment, whereby the interior portion of the holding compartment can be sealed from the admittance of gases from outside the interior portion of the holding compartment when the interior portion of the holding compartment is substantially entirely contained within the external enclosure;

a gas evacuation system in gas flow communication with the interior portion of the holding compartment for removing gases from the interior portion of the holding compartment when the interior portion of the holding compartment is sealed from the admittance of gases from outside the interior portion of the holding compartment;

an automatically controlled valve arrangement, separate from the gas evacuation system, in gas flow communication with the interior portion of the holding compartment for selectively only admitting gases to the interior portion of the holding compartment from outside the interior portion of the holding compartment and preventing the admittance of gases to the interior portion of the holding compartment from outside the interior portion of the holding compartment;

an automatically attachable and releasable latching mechanism for securing the holding compartment and the external enclosure together when the interior portion of the holding compartment is substantially entirely contained within the external enclosure and causing the engaging surfaces of the external enclosure and the holding compartment along with the seal positioned between the engaging surfaces to all come into engagement, whereby the engaging surfaces of the holding compartment and the external enclosure are prevented from disengaging and allowing gases from outside the interior of the holding compartment to enter the interior of the holding compartment, the latching mechanism comprising a fixed retaining component mounted at a rear of one of the holding compartment and the external enclosure and a movable latching component mounted at a rear of the other of the holding compartment and the external housing, the fixed retaining component and the movable latching component being located in relation to one another so that when the holding compartment is substantially entirely contained within the external enclosure the movable latching component can latch onto the fixed retaining component and secure the holding compartment and the external enclosure together and a controller for controlling the operations of the gas evacuation system, the automatically controlled valve arrangement and the automatically attachable and releasable latching mechanism.

9. The storage system of claim 8 wherein the latching mechanism functions to be disabled from securing the holding compartment and the external enclosure together when the gas evacuation system has removed sufficient gas from the interior portion of the holding compartment to establish a pressure differential between the interior portion of the holding compartment and the exterior of the external enclosure adequate to maintain the holding compartment and the external enclosure secured together.

10. The storage system of claim 9 wherein the seal is attached at one of the engaging surfaces of the holding compartment and the external enclosure and includes a first portion that first contacts the one of the engaging surfaces of the holding compartment and the external enclosure to which the seal is not attached when the engaging surfaces are brought together and a second portion, the first portion of the seal being more pliable and thinner than the second portion of the seal.

11. The storage system of claim 10 wherein the first portion of the seal provides a soft initial seal between the holding compartment and the external enclosure as the engaging surfaces of the holding compartment and the external enclosure are first brought together and the second portion of the seal provides a more secure seal as the engaging surfaces of the holding compartment and the external enclosure continue to be brought more closely together.

12. The storage system of claim 11 wherein the seal comprises a tubular structure that is substantially rectangular in cross-section with the first portion of the seal comprising one of the two longer sides of the rectangle and the second portion of the seal comprising the other of the two longer sides of the rectangle and the two shorter sides of the rectangle, and the seal is attached to one of the engaging surfaces of the holding compartment and the external enclosure at the other of the two longer sides of the rectangle.

13. The storage system of claim 8 wherein the movable latching element comprises a hook-shaped element that is movable between a position where the hook-shaped element is free of the fixed retaining component and a position where the hook-shaped element is attached to the fixed retaining component.

14. The storage system of claim 13 wherein the movable latching element further comprises a driving arrangement operatively associated with the hook-shaped element for moving the hook-shaped element between the position where the hook-shaped element is free of the fixed retaining component and the position where the hook-shaped element is attached to the fixed retaining component.

15. The storage system of claim 14 wherein the driving arrangement includes a motor operatively associated with the hook-shaped element, the motor having a drive shaft.

16. The storage system of claim 15 wherein the hook-shaped element includes two spaced apart abutments and the driving arrangement includes a cam located between the two spaced apart abutments, and wherein the motor drive shaft is attached to the cam so as to rotate the cam between the two abutments on the hook-shaped element and cause the hook-shaped element to move between a position toward the fixed retaining component and a position away from the fixed retaining component.

17. The storage system of claim 16 including a fixed pin located in a slot in the hook-shaped element, the slot having a configuration such that as the rotating cam moves the hook-shaped element between the position away from the fixed retaining component and the position toward the fixed retaining component, the fixed pin in the slot causes the hook-shaped element to move between the position where it is free of the fixed retaining element and the position where it is latched to the fixed retaining element.

* * * * *